May 28, 1935.  A. CAMBRON ET AL  2,002,524

THERMAL TREATMENT OF GASES AND VAPORS

Filed Feb. 23, 1933

INVENTORS:
A. CAMBRON AND C. H. BAYLEY

BY *A. E. macRae*

ATTORNEY.

Patented May 28, 1935

2,002,524

UNITED STATES PATENT OFFICE 2,002,524

THERMAL TREATMENT OF GASES AND VAPORS

Adrien Cambron and Colin Hahnemann Bayley, Ottawa, Ontario, Canada

Application February 23, 1933, Serial No. 658,098

5 Claims. (Cl. 260—170)

This invention relates to the thermal treatment of gases or vapors to produce desired chemical reactions and, more particularly, to the thermal treatment of lower paraffin hydrocarbons in the gas or vapor phase for the production of products containing high percentages of valuable unsaturated hydrocarbons, such as olefines.

It is well known, for example, that, when heated to a suitable temperature, the lower paraffins having more than one carbon atom are converted into a mixture of olefines, hydrogen, paraffins having a lower number of carbon atoms, and unchanged paraffins. Complete conversion of ethane or propane, for example, would give a product containing 50% of olefines by volume but, when using heretofore known processes, the maximum concentration is never even (nearly) approached without the formation of by-products such as liquid hydrocarbons, tar and free carbon. The formation of free carbon is particularly objectionable as it causes frequent interruption of the operation of the process to clean out the reaction tubes, reduces the yield of olefines and limits the temperature at which the process can be economically operated.

The object of the present invention is to provide a process and apparatus whereby such endothermic reactions may be carried out with greater efficiency, producing higher yields of the desired products and without substantial formation of objectionable by-products, which reduces the yield of the desired product, lowers the efficiency of the process and limits the temperature at which it can be economically operated.

A further object of the invention is to provide a process and apparatus for the thermal treatment, particularly, of paraffin hydrocarbons containing more than one carbon atom in which the heat transfer to, and the rate of flow of, the gases or vapors are coordinated so as to insure maximum progress of the desired reaction and with the substantial elimination of objectionable side reactions, such as the polymerization of olefines to liquids and tar and the formation of free carbon. A still further object is to so regulate the flow of the gas or vapor as to maintain in the reaction zone a maximum of uniformity in the temperature of the gas or vapor, in order to secure economical conversion of the paraffins to olefines or other desired products.

The invention will now be described with reference to the accompanying drawing, in which—

Figure 1:
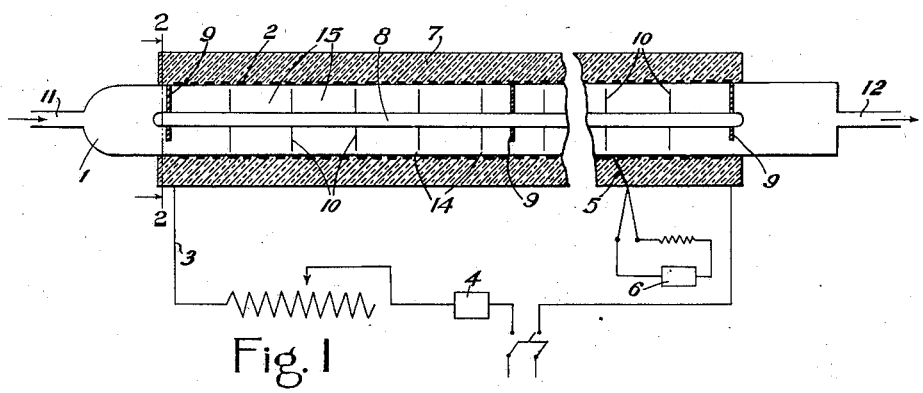
Figure 1 is a longitudinal section on line 1—1 of Figure 2.
Figure 2:
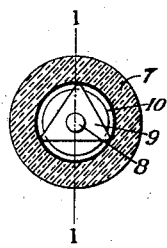
Figure 2 is a cross section on line 2—2 of Figure 1.

In the drawing, 1 represents the reaction tube, which may be heated in any desired way, as by a heating coil 2 connected to an electric power line 3. An ammeter is shown at 4. A thermocouple 5 is connected with a millivoltmeter 6. 7 represents any desired form of insulation about the heating coil and tube. A rod 8 is centrally disposed within the reaction tube by means of supports 9. On this rod are located, perpendicularly to the rod, a plurality of spaced baffles 10 having a diameter somewhat less than the internal diameter of the tube. The baffle diameter is preferably substantially 0.8 to 0.9 of the tube diameter and the baffle spacing on the rod is preferably substantially 0.5 to 1.0 of the tube diameter. The tube has a gas inlet 11 and an outlet 12.

Figure 3:
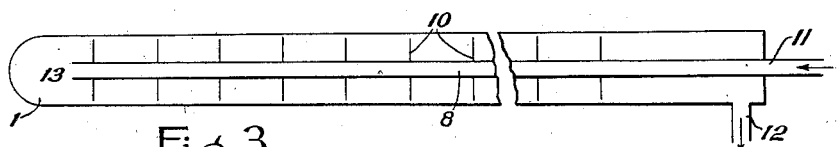
Figures 3 and 4 show diagrammatically alternate forms of the reaction tube.
Figure 4:
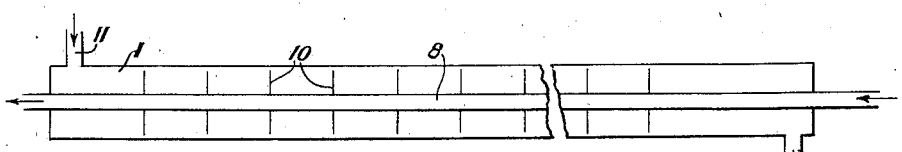

In the reaction tube illustrated in Figure 3 the support 8 is tubular and the gas is admitted through the tubular support at 11, entering the reaction zone at 13 and the products are discharged at the outlet 12. In the illustration of Figure 4 the support 8 is also tubular and through it a stream of water or steam may be passed countercurrent to the flow of gases in the reaction zone. These forms of the apparatus may be used with advantage, particularly where the reaction products contain relatively unstable compounds, such as isobutylene, butadiene and the like.

Two of the tubes may be connected in series, one being used for preheating and the other as the reaction tube. The connection between the two tubes is well insulated against heat loss.

In operation the flow of the gases or vapors in the heated reaction zone is definitely influenced by each successive baffle. The linear velocity of the gases or vapors is alternatively high in the narrow passages 14, between the circumference of each baffle and the tube wall, and low in the larger zones 15 between the baffles and, at the same time, a rapid movement of the gases in the zones 15, in relation to the heated wall of the tube, is substantially maintained, due to the formation of a standing eddy in each of these zones. In the rapid flow through the narrow passages 14, the gases in contact with the heated tube wall are continuously changing, thus preventing overheating of portions of the gases in their forward movement through the tube, and owing to the eddy formation in the zones is the rapid movement of the gases in relation to the heated wall prevents overheating at the tube wall and, at the same time, causes rapid heat exchange within the gas. Owing to the continued repetition of these successive operations maximum uniformity of heat distribution in the gas current is obtained and, at the same time, the heat is most effectively transferred from the tube wall to the gases or vapors.

The increase in the rate of heat transfer between the hot walls and the gas undergoing treatment has been found, in some cases, to exceed 100% and, at the same time, side reactions, such as the polymerization of olefines to liquids and tar and the formation of free carbon, have been completely eliminated even when the fraction of the initial paraffin converted on one passage through the reaction zone is as high as 80% and the concentration of olefines in the product is in excess of 40% by volume. As a comparison, it may be stated that if the gas is passed through an open reaction tube at a similar rate, it is found that the formation of by-products begins when the percentage decomposition of the gas is about 30 and the concentration of olefines in the product is between 20 and 25%.

The following examples are illustrative of the operation of the invention:

(1) Two tubes of the character described having an internal diameter of 2.5 cm. and 40 cm. of heated section are connected in series. The baffles in the tubes are 2.2 cm. in diameter, spaced 1.4 cm. apart upon a rod 0.7 cm. in diameter. Ethane is passed through the tubes at the rate of 840 litres per hour. The heating is so controlled that the wall temperature at the exit end of the preheating tube and throughout the length of the reaction tube is 940° C. Under these conditions there are obtained 1340 litres per hour of a gas containing 33.1% by volume of ethylene and 34.2% by volume of hydrogen.

(2) Propane is passed at the rate of 840 litres per hour through tubes as described in the previous example and the wall temperature at the exit end of the preheating tube and throughout the length of the reaction tube is maintained at 947° C. There are thus produced 1510 litres per hour of a gas containing 26.1% by volume of ethylene and 11.7% by volume of propylene, 71.5% of the entering propane being converted to olefines and the yield of olefines being 820 grams per hour with a current consumption of 1.5 k.w. hours per pound of olefines.

(3) 800 litres per hour of N-butane passed through similar tubes at corresponding temperatures of 915° C. give 1515 litres per hour of a gas containing 15.8% by volume of ethylene, 17.3% by volume of propylene and 5.3% by volume of butylenes. This is a yield of 995 grams of olefines per hour with a current consumption for heating purposes of 1.35 k.w. hours per pound of olefines.

(4) Hexane, containing about 40% 2-methyl pentane, 20% 3-methyl pentane, 30% n-hexane and 10% of other hydrocarbons, is passed at the rate of 905 grams per hour through a single tube as described in Example 1 heated to a wall temperature at the exit end of 952° C. The product is 694 litres per hour of a gas containing 29.0% by volume of ethylene, 19.7% by volume of propylene and small amounts of butylenes and butadiene. The yield of olefines is 544 grams per hour with a current consumption of 1.08 k.w. hours per pound of olefines.

(5) A mixture of 145 litres of dipentene vapor diluted with 300 litres of carbon dioxide is passed, per hour, through the apparatus of Example 1 with the temperature of the preheater at 390° C. and that of the reaction tube at 740° C. Isoprene is produced at the rate of 77 grams per hour. A considerable amount of unchanged dipentene is recovered.

(6) A mixture of 57.7 litres of cyclo-hexane vapor diluted with 196 litres of carbon dioxide is passed, per hour, through a reaction tube 2.0 cm. in diameter, with 1.7 cm. diameter baffles mounted on a 0.5 cm. diameter rod. The tube is heated to 895° C. over a length of 30 cm. There are obtained per hour 68.4 grams of butadiene with 47 grams unchanged cyclohexane.

While the invention has been described with particular reference to specific examples, it will be apparent that it may be widely used in vapor-phase cracking or other thermal treatments of gases or vapors where the rate and uniformity of heat transfer are of particular importance.

Electrical heating as described has advantages particularly in relation to heat control but the use of natural gas or other gaseous, liquid or solid fuels may be more economical under certain local conditions.

It will be observed that location of the solid disc baffles perpendicularly to the axis of the reaction zone completely obstructs a direct flow of the gases through the central portion of the zone and provides for a maximum sweeping action of the heated wall, thus continuously changing the gas layer in contact with the heated wall. The increased velocity at successive points produces a high degree of turbulence in the gas current and the larger zones between the baffles offer repeated opportunity for uniform distribution of the heat in the gas.

We claim:

1. In the thermal treatment of hydrocarbon gases or vapors in an externally heated reaction zone the process which comprises maintaining within the zone a temperature in excess of 700° C., causing said gases or vapors to flow through a continuous unobstructed narrow space along the heated wall of said zone and abruptly varying the linear velocity of the gases or vapors at successive points in their flow in said space along said heated wall.

2. A process as defined in claim 1 wherein rapidly rotating eddies are formed between said spaces and the gases are mixed in said eddies.

3. In the thermal treatment of hydrocarbon gases or vapors in an externally heated reaction zone the process which comprises maintaining within the zone a temperature in excess of 700° C., causing said gases or vapors to flow through a continuous unobstructed narrow space along the heated wall of said zone and abruptly varying the linear velocity of the gases or vapors at successive points in their flow in said space along said heated wall, while permitting intermingling of the gases or vapors in successive zones between said points.

4. In the thermal treatment of lower paraffin hydrocarbons in the vapor phase in an externally heated reaction zone maintained at a temperature in excess of 700° C., the process which comprises passing said vapors through a continuous unobstructed narrow space along the heated wall of said zone and repeatedly altering the linear rate of flow of said vapors by alternately passing them through a restricted annular passage constituting part of said narrow space adjacent the heated wall of said zone and an adjacent zone not so restricted to cause the vapors to be uniformly and quickly heated and to avoid undesired side reactions.

5. A process for the production of olefines which comprises passing vapors of lower paraffin hydrocarbons through a continuous unobstructed narrow space along the wall of an externally heated reaction zone maintained at a temperature in excess of 800° C., repeatedly and abruptly increasing and decreasing the linear rate of flow of said vapors adjacent said wall and intimately intermingling said vapors between each said abrupt decrease and the succeeding abrupt increase in said linear rate of flow.

ADRIEN CAMBRON.
COLIN H. BAYLEY.